Oct. 12, 1943.     H. J. WADDELL     2,331,362
SELF LUBRICATING VALVE
Filed April 6, 1942     2 Sheets-Sheet 1

Inventor
HOMER J. WADDELL
By W. J. McDowell
Attorney

Oct. 12, 1943.                H. J. WADDELL                2,331,362
                          SELF LUBRICATING VALVE
                  Filed April 6, 1942        2 Sheets-Sheet 2
FIG. 3.
FIG. 5.
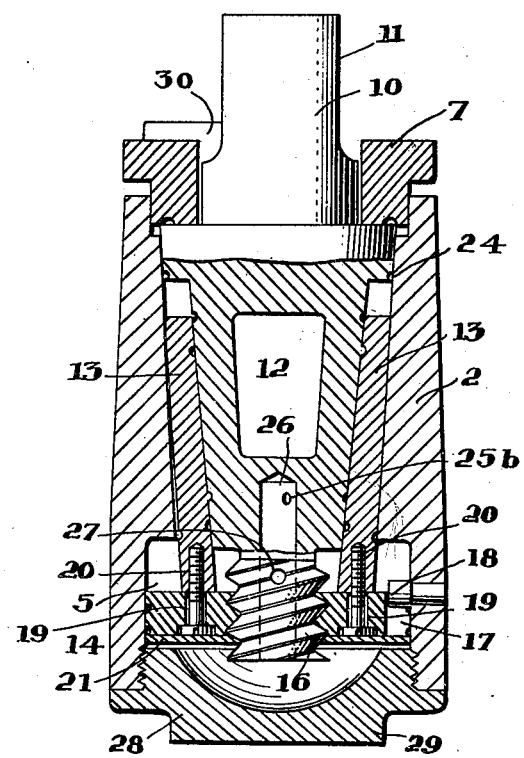
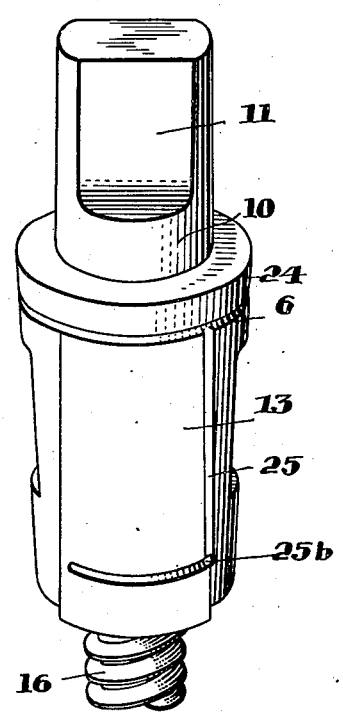
FIG. 7.
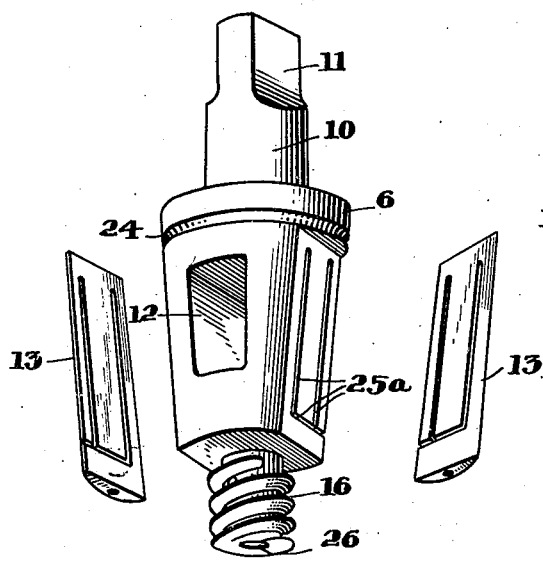
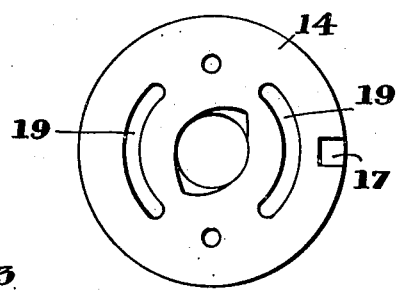
FIG. 6.
Inventor
HOMER J. WADDELL
By W. S. McDowell
Attorney Patented Oct. 12, 1943

2,331,362

UNITED STATES PATENT OFFICE 2,331,362

SELF-LUBRICATING VALVE

Homer J. Waddell, Baltimore, Ohio

Application April 6, 1942, Serial No. 437,894

7 Claims. (Cl. 251—93)

This invention relates generally to valves and more particularly to valves of the plug type having means to effect their lubrication.

Heretofore, valves of the above-mentioned type operated faultily because of the tendency of the parts thereof to stick and resist movement between open and closed positions. There was also a grave danger of leakage if the parts of the valve were secured loosely enough together to permit relatively easy opening and closing movements. Previously proposed valves of this general type also were objectionable because frequent attention was required to effect their lubrication. Frequently the lubrication thereof was neglected with the result that the valves prematurely deteriorated and gave inefficient service. In most instances, the valves could not be used in high pressure lines because of the danger of leakage.

Among the objects of this invention is the provision of a stop valve with means for effecting the lubrication of the moving parts thereof automatically, upon the operation of the valve between open and closed positions.

Another object of the invention resides in constructing a stop valve with a plug composed of a plurality of sections and providing means in the valve to effect relative movement between the sections whereby certain ones thereof will be forced into firm engagement with the valve casing to effectively seal the same when the valve is closed and moved away from the casing a limited extent, when the valve is opened, to facilitate movement and lubrication of the various parts.

A further object rests in forming a valve with a tapered plug adapted for positioning in a tapered socket in the valve casing, the plug having relieved areas on opposite sides thereof to receive side plates which complete the plug, the plates being moved into registration with the inlet and outlet ports when the valve is closed, means also being provided in the valve and operated by the actuation of the plug to move the side plates longitudinally of the plug to cause them to be forced into firm engagement with the casing to completely close the inlet and outlet ports.

A still further object resides in providing the valve casing with a chamber for the reception of a lubricating medium and positioning a member in said chamber for movement therein to force the lubricating medium through a series of passages to effectively lubricate the moving parts of the valve, means being provided in the valve to transmit movement from the plug of the valve to the member in the lubricant-receiving chamber whereby said member will be moved in the chamber upon movement of the plug.

Other objects and advantages will be apparent from the following description of one form of the invention which has been illustrated in detail in the accompanying drawings.

In the drawings:

Fig. 3 is a vertical transverse sectional view taken through the valve and showing the plug member thereof in position to provide for fluid flow through the valve;

Fig. 5 is a perspective view of the valve plug in assembled condition;

Fig. 6 is a similar view showing the parts of the plug in spaced relation;

Fig. 7 is a plan view of the piston employed in forcing the lubricant from the lubricant chamber into the conducting passages.

Figure 1:
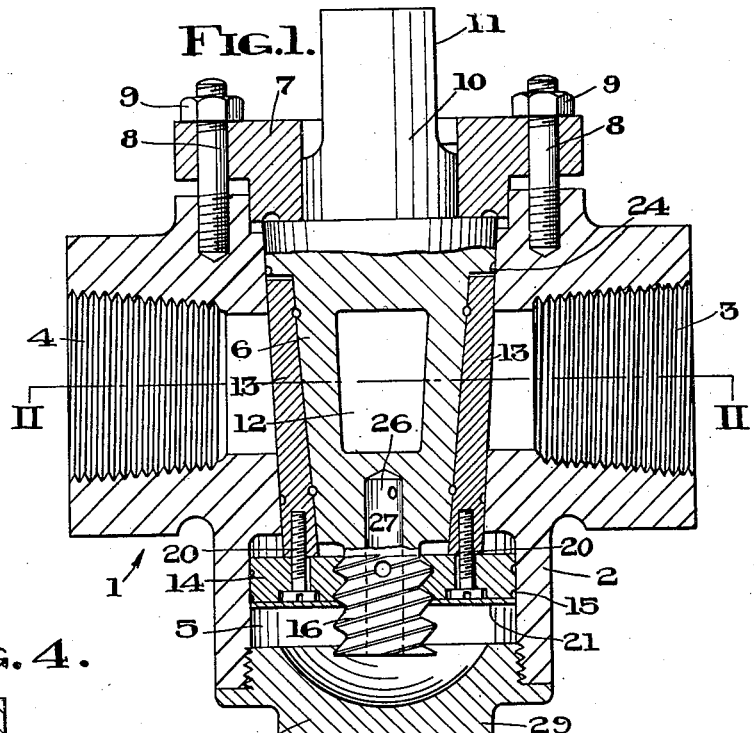
Fig. 1 is a vertical longitudinal sectional view taken through a valve formed in accordance with the present invention and showing the plug member thereof in a position to obstruct fluid flow through the valve.
Figure 4:
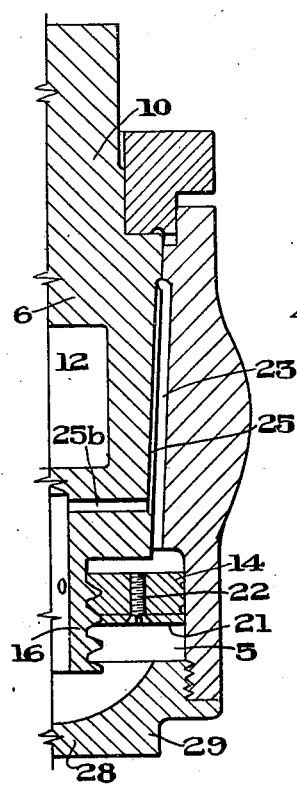
Fig. 4 is a detail vertical sectional view on the plane indicated by the line IV—IV of Fig. 2 and showing lubricant conducting passages formed between the plug and the casing.
Figure 2:
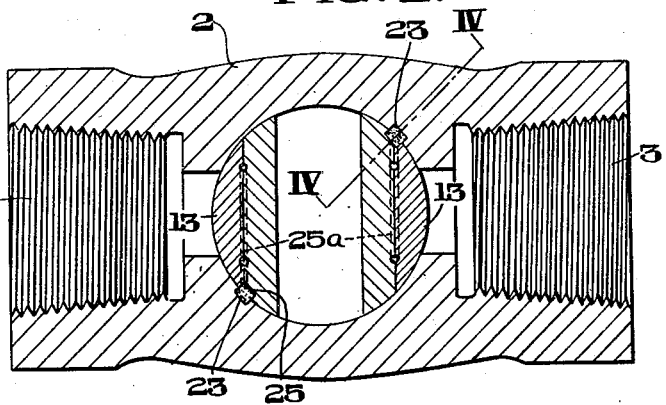
Fig. 2 is a horizontal sectional view taken through the valve on the plane indicated by the line II—II of Fig. 1.

Referring more particularly to the drawings, the numeral 1 designates the improved valve in its entirety. This valve includes a casing 2 formed from cast metal such as iron or brass and having inlet and outlet passages 3 and 4 which in this instance are arranged in longitudinal registration. The inner ends of these passages communicate with a tapered socket, the axis of which is at right angles to the registering axes of the inlet and outlet ports. At its lower end, the socket connects with a lubricant-receiving chamber 5 which is slightly larger in diameter than the socket. The upper end of the socket is open to permit a tapered plug 6 to be positioned in the valve body. This plug is held in place by a plate 7 which is secured to the casing by stud bolts 8 and nuts 9. The plate has an opening through which the reduced extension 10 of the plug projects, the upper end of the extension being flattened as at 11 to receive a tool employed to rotate the plug in the valve casing.

In registration with the inlet and outlet ports, the plug is provided with a transverse passage 12 which, when the plug is in the position shown in Fig. 3, establishes communication between the inlet and outlet ports to provide for fluid flow through the valve. When this passage is at right angles to the axes of the inlet and outlet ports, fluid flow through the valve will be interrupted. At this time, side plates 13 forming a part of the plug will be in registration with the inlet and outlet ports. The plates 13 have flat inner sides and arcuate outer sides, the latter constituting continuations of the conical exterior surface of the plug. The side surfaces of the plug with which the plates 13 engage converge toward the lower end of the plug so that the plates may be moved longitudinally in the socket and relative to the plug.

Due to the tapered configuration of the plug and the wedge-like section of the plates, the latter will be forced outwardly when moved upwardly with respect to the plug. This outward movement causes the exterior surfaces of the side plates to firmly contact the surface of the socket around the inlet and outlet ports whereby a fluid-tight engagement will be secured when the plug occupies an off position. As the side plates constitute segmental sections of the plug, they will rotate in the socket in unison with the plug. To effect relative longitudinal movement of the side plates, they are connected at their lower ends to a disk-like piston 14 disposed for longitudinal sliding movement in the chamber 5. The peripheral wall of the piston 14 is grooved as at 15 to effect a seal between the spaces at the opposite sides of the piston. At its central portion, the piston is formed with a threaded opening for the reception of a similarly threaded extension 16 provided on the lower end of the plug 6. At one side, the piston is provided with a key slot 17 to receive a guide pin 18 carried by the valve casing. Due to the engagement of the pin 18 with the side walls of the slot 17, the piston will be prevented from rotating and when the plug is rotated, the threads on the extension 16 will move the piston longitudinally in the chamber 5. When the piston moves upwardly in the chamber, the side plates 13 will also move upwardly and into fluid-tight engagement with the socket wall.

If the plug is turned in the opposite direction, the piston will move downwardly, drawing with it the side plates 13. Since these members move away from the wall when they are moved downwardly, the resistance to turning movement of the plug will be decreased and a slight degree of clearance will be developed between the adjoining surfaces of the plug and the socket. When the plug is again moved to cause the piston to move upwardly, lubricating medium previously placed in the chamber 5 will be forced into these spaces to effect the lubrication of the moving parts of the valve.

As illustrated in Fig. 7, the piston is provided with arcuate slots 19 through which screws 20 project to secure the plates 13 to the piston. The heads of these screws are also received in enlarged slots on the under side of the piston so that when the latter member moves downwardly, the plates 13 will also move. A supplemental disk 21 is fastened to the under side of the piston by screws 22 to close the slots 19 and prevent the flow of lubricating medium from one side of the piston to the other.

To effect a circulation of the lubricating medium, the surface of the socket has a plurality of grooves 23 formed therein, these grooves extending longitudinally of the socket and terminating in spaced relation from the upper end thereof. The upper end of the plug is in substantial registration with the upper ends of the grooves 23. The plug has an annular recess 24 which communicates with lubricant grooves 25 formed in the plug and extending longitudinally thereof, these grooves terminating at their lower ends in spaced relation from the lower end of the plug. The grooves 25 are located at the edges of the plates 13 and branch lubricating grooves 25a extend therefrom between the plates and the plug. Passages 25b also extend from the lower ends of the grooves 25 into the plug to connect with a bore 26 drilled through the extension 16 and into the plug.

A second set of transverse passages 27 connect with the bore 26 and lead to the exterior of the extension near the upper end of the threaded portion. When the piston 14 moves upwardly in the chamber 5, lubricating medium in the upper portion of this chamber will be forced into the passages 23 and 27. After the piston has progressed to a point where the passages 27 will be covered thereby, pressure will be applied to the lubricating medium, causing it to flow only through the passages 23 and into the annular groove 24 on the plug. From this groove, the lubricating medium will flow downwardly through the grooves 25, a portion finding its way between the plates 13 and the plug through the branches 25a. The balance of the lubricating medium will continue to flow through the passages 25 into the passages 25b to the bore 26 through which it will flow to the portion of the chamber 5 below the piston.

It will thus be seen that when the plug is turned to cause the piston to move upwardly, the lubricating medium above the piston will be completely circulated through the conducting passages and to the space below the piston. When the piston is moved downwardly, this lubricating medium will be forced into the bore 26 and since the passages 25b are of small diameter, a portion of the lubricating medium will flow through the passages 27 into the space above the piston to again be forced through the circulating passages when the piston is next raised.

The chamber 5 may be filled with lubricating medium by the removal of the cap 28 which is threadedly received by the lower end of the valve body. This cap has a shouldered portion 29 for the reception of a wrench employed to effect turning movement thereof. The top plate 7 may be provided with suitable shoulders 30 to engage the flattened sides of the plug and to limit the turning movement thereof.

From the foregoing, it will be apparent that a valve has been provided in which lubricating medium will be automatically circulated when the valve is actuated between open and closed positions. A valve has also been provided with a sectional plug, portions of which are capable of relative movement to effect an efficient seal when the valve is closed and a release of the plug to facilitate movement thereof when the valve is being adjusted to an open position. While the parts may be modified in numerous ways, it is the intention to reserve the rights to all such modifications as may be said to fall within the scope of the appended claims.

What is claimed is:

1. In a valve, a body having inlet and outlet ports communicating at their inner ends with a socket, plug means disposed for rotary adjustment in said socket, said plug having a port for establishing communication between the inlet and outlet ports in one position of adjustment of said plug, side plates carried by said plug for rotary movement with and longitudinal adjustment relative thereto, said plates registering with the inlet and outlet ports when said plug is in position to interrupt communication between said ports, and means operative upon rotation of said plug to move said plates into and out of firm engagement with the walls of said socket.

2. In a valve, a body having inlet and outlet ports communicating at their inner ends with a socket, plug means disposed for rotary adjustment in said socket, said plug having a port for establishing communication between the inlet and outlet ports in one position of adjustment of said plug, side plates carried by said plug for rotary movement with and longitudinal adjustment relative thereto, said plates registering with the inlet and outlet ports when said plug is in position to interrupt communication between said ports, means positioned in said body and cooperating with said plug to move longitudinally in said socket upon rotary movement of the plug, said means engaging said side plates to impart movement thereto whereby the exterior surfaces thereof will be firmly engaged with the walls of said socket.

3. In a valve, a body having inlet and outlet ports communicating at their inner ends with a tapered socket, a tapered plug disposed for rotary adjustment in said socket, said plug having a port for establishing communication between the inlet and outlet ports in one position of adjustment of said plug, side plate means forming a part of said plug, said plates being movable in unison with said plug upon rotation and relative thereto in a longitudinal direction, said plates registering with said inlet and outlet ports when said plug is in position to interrupt communication between said ports, a piston disposed for movement in said body in a longitudinal direction relative to said socket, and means cooperative with said plug and piston to cause the latter to move upon rotation of the former, said piston engaging and moving said side plates to cause firm engagement thereof with said socket walls.

4. In a valve, a body having inlet and outlet ports separated by a tapered socket, said body having a lubricant-receiving chamber, a tapered plug disposed for rotary movement in said socket, said plug having a plurality of side sections movable relatively thereto and a port for establishing communication between said inlet and outlet ports in one position of rotary movement of said plug, piston means movable in said lubricant chamber, passage means between said plug and body and communicating with said chamber, means cooperative with said plug and piston to cause movement of the latter in said chamber upon rotation of the former to force lubricant through said passage means, said piston also engaging the side sections of said plug to move the same into firm engagement with the wall of said socket.

5. In a valve, a body having inlet and outlet ports separated by a tapered socket, said body having a lubricant-receiving chamber, a tapered plug disposed for rotary movement in said socket, said plug having a plurality of side sections movable relatively thereto and a port for establishing communication between said inlet and outlet ports in one position of rotary movement of said plug, piston means movable in said lubricant chamber, lubricant circulating passage means communicating at one end with said chamber on one side of said piston and at the other end with said chamber on the opposite side of said piston, means cooperative with said plug and piston to cause movement of the latter in said chamber upon rotation of the former whereby lubricant will be forced from said chamber through said circulating passage means, movement of said piston in one direction serving to move the side sections of said plug into firm engagement with the wall of said socket.

6. In a valve, a body having inlet and outlet ports separated by a tapered socket, said body having a lubricant-receiving chamber, a tapered plug disposed for rotary movement in said socket, said plug having opposed flattened side surfaces and a port to establish communication between said inlet and outlet ports, side sections positioned in movable engagement with said flattened surfaces, said sections having arcuate exterior surfaces constituting continuations of the exterior surfaces of said plug, said sections registering with the inlet and outlet ports when said plug is in position to interrupt communication between said inlet and outlet ports, means for moving said sections relative to said plug comprising a piston member movably supported in said body, and cooperating means on said piston and plug to impart movement to the former upon rotation of the latter whereby said piston will engage said sections to force the same into firm engagement with the socket walls.

7. In a valve, a body with inlet and outlet ports communicating at their inner ends with a socket, said body having a lubricant-receiving recess at one end of said socket, a plug member positioned for rotary adjustment in said socket, said plug having a port to establish communication between said inlet and outlet ports in one position of adjustment of said plug, a plurality of side sections forming parts of said plug, said sections being rotatably adjustable in said socket in unison with said plug and movable longitudinally in said socket independently of said plug, passage means communicating with said lubricant chamber for conducting lubricant therefrom to the contacting surfaces of said plug and socket, piston means in said lubricant chamber, means operative upon rotation of said plug to move said piston in said chamber to force lubricant through said passage means, and means connecting the side sections of said plug to said piston means whereby the former will be moved into and out of firm engagement with the socket walls upon operation of the latter.

HOMER J. WADDELL.